UNITED STATES PATENT OFFICE.

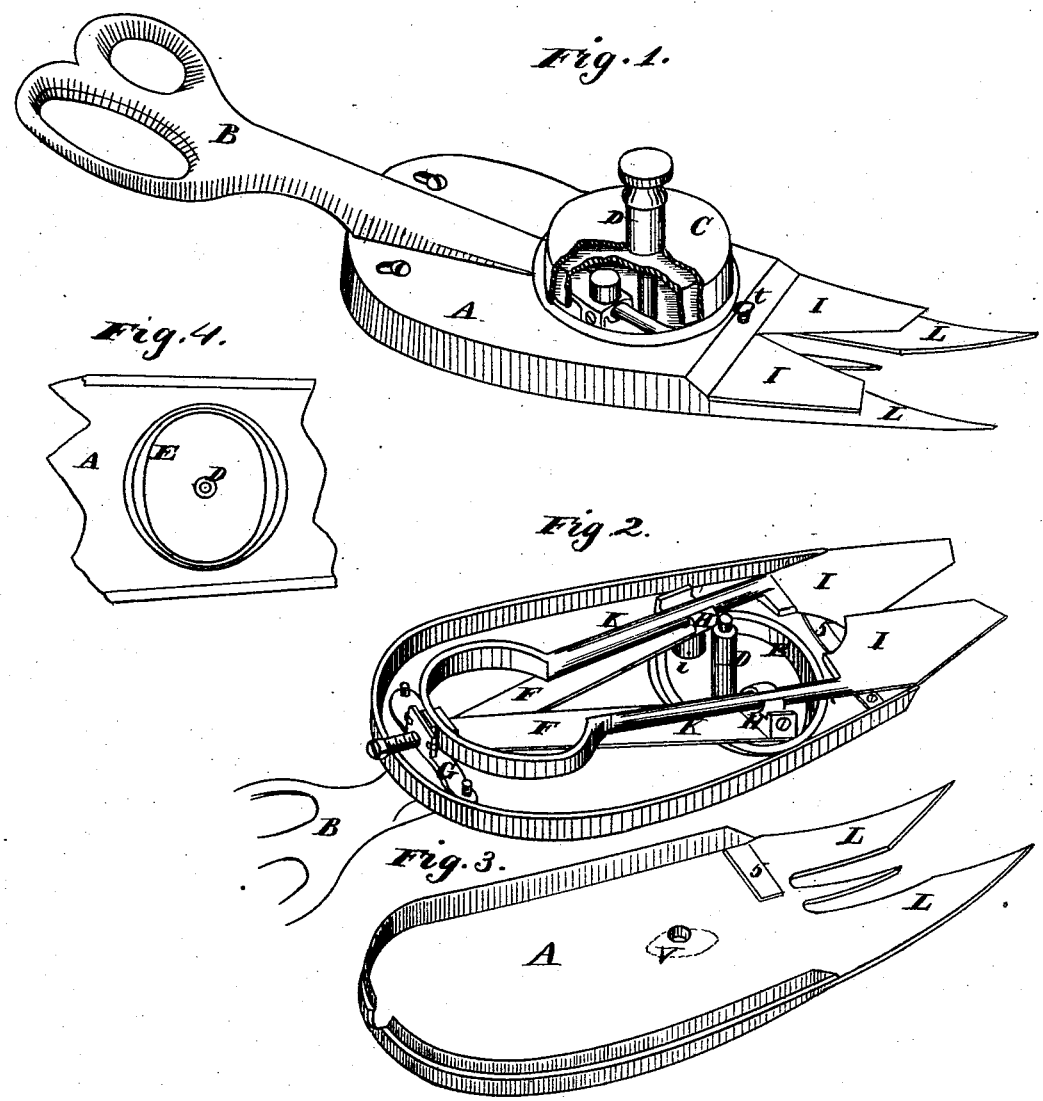

EPHRAIEM CHAQUETTE, OF INDEPENDENCE, CALIFORNIA.

IMPROVEMENT IN SHEEP-SHEARING DEVICES.

Specification forming part of Letters Patent No. 157,156, dated November 24, 1874; application filed October 15, 1874.

*To all whom it may concern:*

Be it known that I, EPHRAIEM CHAQUETTE, of Independence, Inyo county, State of California, have invented an Improved Sheep-Shearing Device; and I do hereby declare the following description and accompanying drawings are sufficient to enable any person skilled in the art or science to which it most nearly appertains to make and use my said invention or improvement without further invention or experiment.

My invention relates to a combination of devices for operating a pair of ordinary sheep-shears, power being applied to a shaft for the purpose; and this device is intended more especially to be used in connection with the sheep-shearing machine for which I have already made application for separate Letters Patent.

In order to more fully illustrate and describe my invention, reference is had to the accompanying drawing, forming a part of this specification, in which—

Figure 1 is a perspective view of my invention, with the cover in place. Fig. 2 is a perspective view, with the cover removed. Fig. 3 is a perspective view of the bottom plate of the case. Fig. 4 shows a plan of the cam.

A is the flat case, inside of which the operating mechanism and the body of the shears are contained, and B is the dummy-handle, which serves to enable the operator to guide the implement when shearing. The top of the case has a circular opening in it, and over this opening is formed or secured an inverted circular cup-shaped box, C, so as to form a circular cavity or socket in the top of the case. The shaft D, which transmits the power and communicates motion to the shears, passes through the center of the top of the box C and passes down through the case A, so as to step in the bottom of the case. An inverted cup-shaped cam, E, is secured to this shaft inside of the cavity formed by the box C. Inside of the case, near its rear end, I secure one end of two levers, F F, one upon the other, by means of a pin or bolt which will allow them to move sidewise, and over the ends of the levers I secure a clamp, G. These levers extend forward, so that their opposite ends are opposite the middle of the cam E. To the forward end of each of these levers I secure an anti-friction roller, $i$, so that the roller will come inside of the cam E, and upon the opposite or lower side of each I secure a clamp, H. I then take any pair of ordinary sheep-shears, I, such as are used for shearing sheep by hand, and fasten the middle of the bow or spring J in the clamp G. The shank K of each blade of the shears I then secure in one of the clamps, H, at the ends of the lever-arms. The shear-blades will then pass out through the slot in the front of the case A and lie directly over or upon the guards L, which extend forward from the bottom of the case.

It is therefore evident that when the cam-cup E is rotated it will alternately force the rollers $i$, outer ends of the lever-arms F F, and the shear-blades, to and from each other in the manner of operating shears by hand.

The clamp G, which secures the rear end or bow of the shears, is secured in the case by bolts or screws which pass up through slotted holes in the top of the case, so that the clamp can be adjusted back and forth, as desired, in order to draw the shear-blades farther into the case or project them farther out.

As one shear-blade moves back and forth above the other I form a ledge, 5, on the bottom part of the case and partly across the opening through which the shear-blades pass, so that the uppermost shear-blade can rest upon it. I then apply a set-screw, $t$, through the top of the case, so that its lower end will press upon the upper blade and close it down against the under blade, for the purpose of keeping their cutting-edges together. Underneath the bottom of the case I form an oil-box, V, in which the shaft D steps, so that the bearing will be well lubricated.

By this arrangement I provide a device which will operate ordinary hand sheep-shears, and permit of their use in connection with my sheep shearing and holding machine.

Having thus described my invention, what

I claim, and desire to secure by Letters Patent, is—

The sheep-shears I, in combination with the adjustable bow-clamp G, pivoted lever-arms F F, with their end-clamps H and rollers i, cam E, guards L L, and case A, substantially as and for the purpose above described.

In witness whereof I hereunto set my hand and seal.

EPHRAIEM CHAQUETTE. [L. S.]

Witnesses:
 JOHN L. BOONE,
 C. M. RICHARDSON.